United States Patent [19] [11] 3,761,211
Parkinson [45] Sept. 25, 1973

[54] MULTI-LAYER EXTRUSION APPARATUS
[75] Inventor: Edward J. Parkinson, Saginaw, Mich.
[73] Assignee: Crompton & Knowles Corporation, Worcester, Mass.
[22] Filed: Jan. 17, 1972
[21] Appl. No.: 218,445

[52] U.S. Cl. .............................. 425/131, 425/462
[51] Int. Cl. ............................................ B29f 3/01
[58] Field of Search ............... 425/130, 131, 132, 425/133, 113, 461, 462; 137/625.41; 264/171

[56] References Cited
UNITED STATES PATENTS
| | | | |
|---|---|---|---|
| 3,315,306 | 4/1967 | Ladner et al. | 425/131 |
| 3,464,087 | 9/1969 | Koch | 425/131 |
| 3,489,178 | 1/1970 | Kice | 137/625.41 |
| 3,218,971 | 11/1965 | Rowland | 425/131 X |
| 3,480,998 | 12/1969 | Von Erdberg | 425/109 |
| 3,557,265 | 1/1971 | Chisholm et al. | 425/4 X |
| 3,559,239 | 2/1971 | Work et al. | 425/131 |

Primary Examiner—R. Spencer Annear
Attorney—Howard G. Garner, Jr.

[57] ABSTRACT

An extrusion apparatus die assembly for producing laminated film, the apparatus includes a die block which has a die passage leading to a pair of die lips through which thermoplastic materials can be extruded, an adaptor connected to the die block and having a main channel connected to the die passage, a pair of feed channels which converge into the main channel and a valving means located at the point of convergence of the feed channels for controlling the relative flow of thermoplastic materials from the feed channels into the main channel.

6 Claims, 4 Drawing Figures

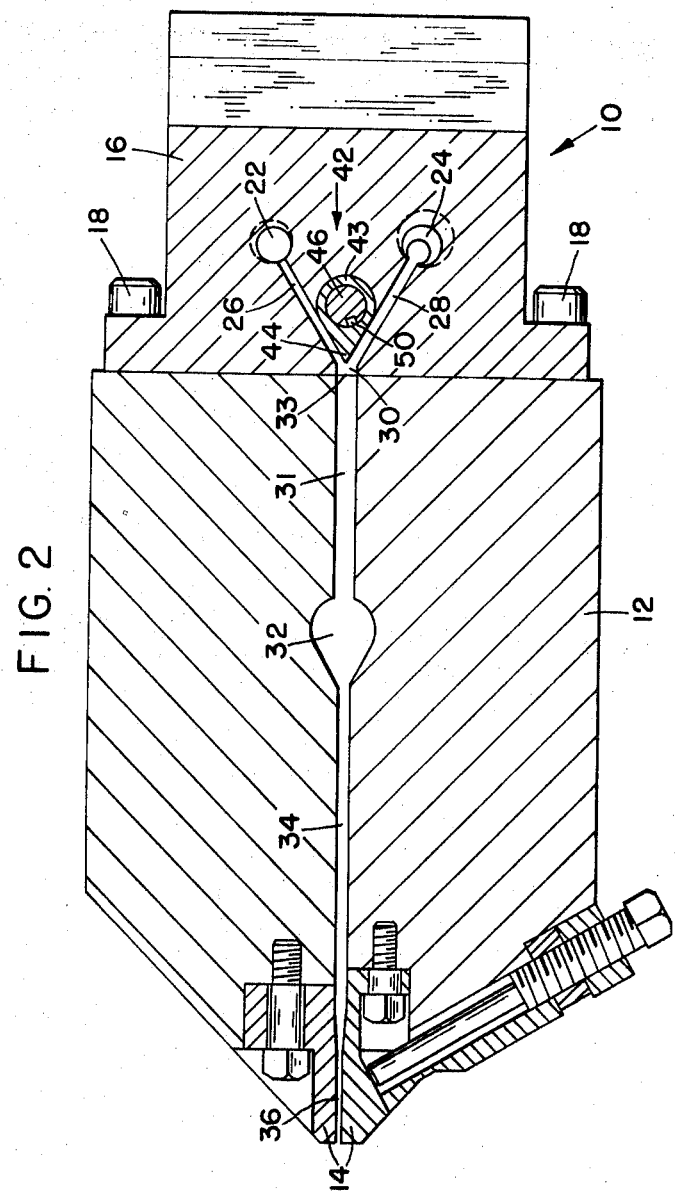
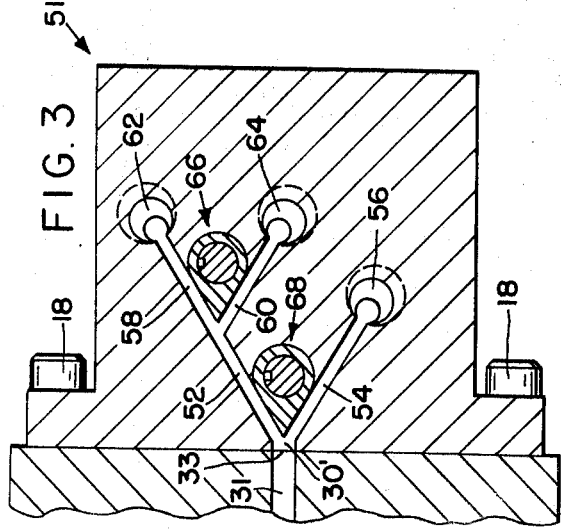
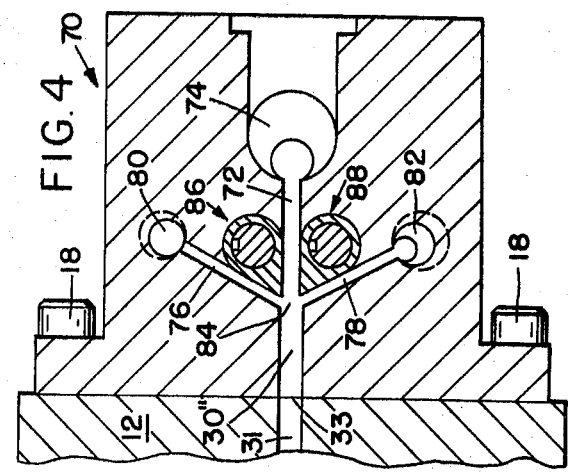

MULTI-LAYER EXTRUSION APPARATUS

BACKGROUND OF THE INVENTION

This invention relates to apparatus for extruding thermoplastic film wherein two or more diverse thermoplastic materials are extruded from a single die and emerge as a single laminated film. The invention more particularly relates to means for supplying the diverse materials to the die wherein the relative thicknesses of the individual layers are controlled outside of the die.

Multi-layer extrusion dies have recently been developed in which there is a cavity or chamber for each diverse material. Flow passages lead from the cavities and converge into an outlet passage which then leads between a pair of die lips. Although there are several variations in design, all of the known devices include adjustable means in the die for individually constricting a portion of each flow passage so that the amount of material flowing from each flow passage to the outlet passage can be varied and therefore the relative thicknesses of the layers in the extruded film can be varied. In all cases, the flow passages have the same width as the extruded film so that the diverse materials flow as individual molten sheets and converge into a single laminated molten sheet.

The principal disadvantage of the above-described multiple laminate dies lies in the high cost of producing such a die. This represents a substantial investment for a specialized item, particularly if several different dies are required.

SUMMARY OF THE INVENTION

It is a principal object of the present invention to produce an extrusion die assembly for extruding film having two or more layers wherein an adaptor is connected to a standard single layer die and supplies the die with diverse thermoplastic materials in a molten laminated stream.

It is a further object of the invention to produce a novel valving means in the adaptor for varying the relative amounts of diverse thermoplastic materials delivered to the die to produce extruded film having different relative thicknesses between the different layers in the laminate.

Materials are fed to the adaptor from different feed extruders and flow along separate feed channels to finally converge into a main channel. The valving means are located at the point of convergence to vary the relative thicknesses of the thermoplastic materials in the main channel. The materials then flow as a molten laminate into a die passage in the die and are extruded from the die as a multi-layer sheet wherein the relative thicknesses of the layers are proportional to the thicknesses of the molten laminate entering the die from the adaptor.

The width of the stream of materials entering the die from the adaptor is considerable less than the width of the sheet which is extruded from the die. The die passage widens out into a cavity manifold and flow passage which leads to an outlet passage between the die lips. The structure within the die which spreads the thermoplastic material to its final width accounts for the high cost of producing a die. With the present invention, a standard die with a slotted inlet to the die passage may be used and the adaptor may be provided at approximately one sixth the cost of producing a special multi-layer die.

BRIEF DESCRIPTION OF THE DRAWINGS

FIG. 2 is a sectional view taken along line 2—2 of FIG. 1 showing detailed features of the extrusion apparatus;

FIG. 3 is a sectional view of a modified adaptor for producing a film having three layers; and FIG. 4 is a view similar to FIG. 3 and showing a second modified adaptor for producing a film having three layers.

DETAILED DESCRIPTION OF THE INVENTION

Figure 1:
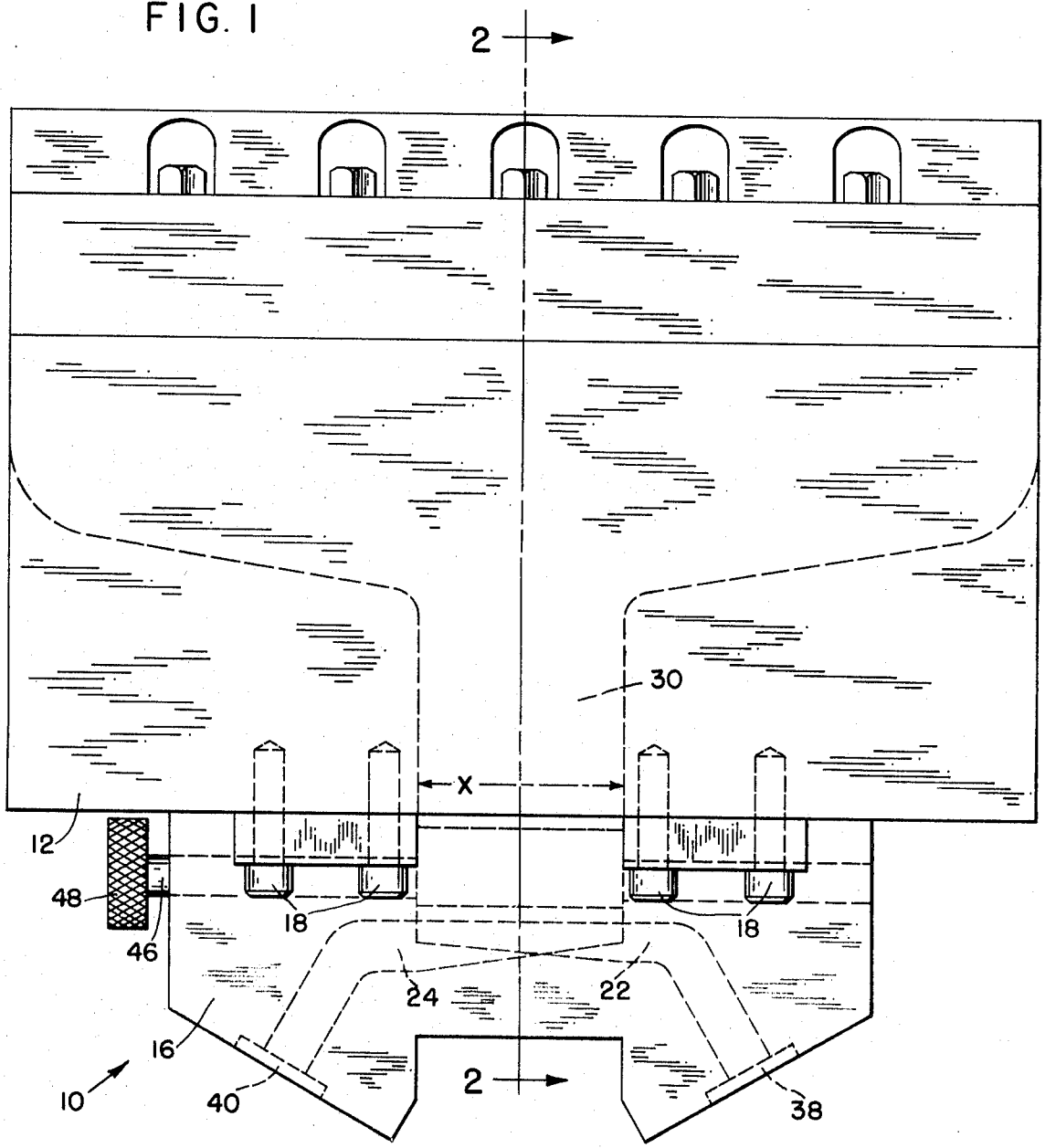
FIG. 1 is a partial plan view of extrusion apparatus embodying the present invention and showing an adaptor for producing a film having two layers.

Referring to FIGS. 1 and 2, the multi-layer extrusion apparatus of the present invention is generally indicated at 10. The embodiment shown in FIGS. 1 and 2 is designed for producing a flat film having two layers. Apparatus 10 includes a die block 12 containing a pair of die lips 14 and an adaptor 16 attached to the die block by studs 18.

Adaptor 16 has a pair of supply ducts 22 and 24, their outer portions being at opposite ends of the adaptor and their inner portions overlapping, one above the other as shown in FIG. 2. Supply ducts 22 and 24 are connected to feed channels 26 and 28 respectively which extend forwardly from their respective supply ducts and converge into a main channel 30 at the forward extremity of the adaptor 16. Channel 30 is connected to a die passage 31 through a die inlet 33. Passage 31 continues forwardly through the die block and comprises a cavity or manifold portion 32 and a flow portion 34 which leads to an outlet passage 36 between the die lips 14.

Thermoplastic material is supplied to ducts 22 and 24 from two separate supply extruder units, not shown, through ports 38 and 40 respectively. The thermoplastic materials supplied from the two extruders may differ in any manner desired. The material may be of different material, compositions or may vary only in appearance such as color. The materials flow forwardly from ports 38 and 40 along ducts 22 and 24 and then along feed channels 26 and 28 respectively and converge in the main channel 30 as a molten laminate. The materials enter die passage 31 through die inlet 33 and continue to flow forwardly along passage 31 as a flat molten laminate but of considerably less width than the die lips and the extruded product. When the molten laminate reaches the cavity portion 32 it fills up the cavity but the two materials making up the molten laminate remain separated and fill the cavity. The two materials occupy the space in the cavity portion 32 in the same ratio of one material to the other as in main channel 31. The cavity or manifold 32 widens out in the well known "coathanger" shape diverging outwardly and forwardly toward opposite ends of the die and terminating into flow portion 34. The molten materials are distributed along the entire width of the flow portion 34 in the same ratio of one material to the other as in the main channel and at the same rate of flow across the entire width thereof.

The ratio of materials in main channel 30 can be varied by a valve generally indicated at 42 which is located between feed channels 26 and 28 for the entire width of the channels indicated by X in FIG. 1. Valve 42 has a rounded rearward portion 43 and a wedge shaped forward portion 44 which forms the inner walls of both feed channels in the area of a convergence. A shaft 46 extends through valve 42 and projects beyond adaptor 16 so that a handle or adjusting knob 48 can be attached thereto. Shaft 46 is keyed to valve 42 at 50 so that by partially rotating knob 48, valve 42 can be adjusted to control the relative openings of both feed channels 26 and 28 into main channel 30. A counterclockwise motion of shaft 46 will reduce the opening of feed channel 28 and enlarge the opening of feed channel 26 and a clockwise motion of shaft 46 will reduce the opening of feed channel 26 and enlarge the opening of feed channel 28 into main channel 30. The ratio of flow with respect to feed channels 26 and 28 can therefore be selectively proportioned by a single partial turn of adjusting knob 48 and the total flow from both feed channels into main channel 30 will remain the same.

Referring to FIG. 3, there is shown a modified adaptor, generally indicated at 51, for producing a film having three layers. Adaptor 51 is attached to die block 12 by bolts 18 in the same manner as adaptor 16. Adaptor 51 has a pair of feed channels 52 and 54 which converge into a main channel 30' which is connected to die inlet 33 in the same manner as channel 30. Thermoplastic material is fed into feed channel 54 from a supply duct 56. A pair of branch feed channels 58 and 60 converge into feed channel 52 and receive thermoplastic material from supply ducts 62 and 64 respectively. A valve 66 similar to valve 42 is located at the convergence point of branch feed channels 58 and 60 for controlling the relative thickness of materials flowing from channels 58 and 60 into channel 52. A valve 68, also similar to valve 42, is located at the point of convergence of feed channels 52 and 54 and controls the relative thickness of material flowing from channels 52 and 54. The relative thickness of both materials flowing from channel 52 with respect to each other will not be changed by valve 68, only the total flow of material flowing from channel 52 with respect to the material flowing from channel 54. The materials entering main channel 30' from feed channels 52 and 54 will comprise a molten three layered laminate which will continue to flow into die passage 31 and eventually emerge through the die lips 14 to form a film having three layers of the same relative thickness as the materials flowing through main channel 30'.

It can be seen that if additional layers are required, adaptors could easily be provided with additional branch channels and additional valves.

Referring to FIG. 4, a second modified adaptor for producing a film having three layers is shown. This adaptor is generally indicated by the reference numeral 70 and is attached to die portion 12 by bolts 18 in the same manner as adaptor 16.

Adaptor 70 has a central feed channel 72 which is connected to a central supply duct 74. Adaptor 70 also has right and left feed channels 76 and 78 which converge into central feed channel 72 at the same point but from opposite sides. Right and left channels 76 and 78 are connected to right and left supply ducts 80 and 82 respectively. Diverse thermoplastic materials are fed through ducts 74, 80 and 82 from diverse supply extruders, not shown, meet at intersection 84 at which point they are formed into a molten three layered laminate which continues to flow along a main channel 30'' into passage 31 and are eventually extruded as a three layered film from die lips 14.

A valve 86 which is similar to valve 42 is located between central channel 72 and right channel 76 to control the relative flow of thermoplastic materials from these two channels into main channel 30''. A second valve, indicated at 88, is located between left channel 78 and central channel 72 for controlling the relative flow of thermoplastic materials therefrom into main channel 30''. Valves 86 and 88 are controlled from outside of the adaptor 70 in the same manner as valve 42 and are effective to control the relative thicknesses of the thermoplastic materials emerging from channels 72, 76 and 78 into main channel 30''.

What is claimed is:

1. Extrusion apparatus for producing a multi-layer sheet of diverse thermoplastic materials comprising:
    a. A die block including a pair of die lips through which said thermoplastic materials can be extruded as a multi-layer sheet, said die block having a die passage for conveying thermoplastic material to said die lips;
    b. An adaptor having a main channel connected to said die passage and a pair of feed channels converging into said main channel for conveying diverse thermoplastic materials to said main channel; and
    c. A proportioning valve located in said adaptor so as to form the point where said feed channels converge into said main channel for selectively proportioning the relative flow of thermoplastic materials between said feed channels while maintaining the total flow of said thermoplastic materials through said feed channels constant.

2. An extrusion die assembly as described in claim 1 wherein said channels are substantially narrower than said die lips and said die passage is the same width as said channels at the point where it is connected to said main channel and widens toward said die lips until it is the same width as said die lips.

3. An extrusion die assembly as described in claim 1 wherein said valve is pivotally mounted between said feed channels and having an elongated wedge shaped portion in which forms the dividing barrier between said feed channels in the area of and including the point of convergence of said feed channels so that the pivoting of said valve will widen one of said feed channels and constrict the other at said point of convergence.

4. An extrusion apparatus as described in claim 1 wherein one of said feed channels is split into two branch feed channels for conveying diverse thermoplastic material and there is a branch proportioning valve located at the converging point of said branch feed channels for controlling the relative flow of thermoplastic material from said branch feed channels to said one feed channel.

5. An extrusion apparatus as described in claim 1 wherein said die block has a third feed channel which converges with one of said pair of feed channels at the point where they converge into said main channel and there is a second proportioning valve located at said point for controlling the relative flow of thermoplastic material between said third feed channel and said one feed channel.

6. An adaptor for a thermoplastic extrusion die having a pair of die lips through which said thermoplastic material can be extruded an elongated die inlet and a die passage for conveying thermoplastic material from said die inlet to said lips, said adaptor having a main channel connected to said die passage, a plurality of feed channels, converging into said main channel, and valve means forming the point of convergence of said feed channels for selectively controlling the relative flow of thermoplastic materials between said feed channels while maintaining the total flow of said materials constant.

* * * * *